(12) United States Patent
Iijima et al.

(10) Patent No.: US 12,658,750 B2
(45) Date of Patent: Jun. 16, 2026

(54) MOTOR ROTOR WITH FRACTURED MAGNET

(71) Applicant: IHI Corporation, Tokyo (JP)

(72) Inventors: Kai Iijima, Tokyo (JP); Naoki Oiwa, Tokyo (JP); Natsuki Yoneyama, Tokyo (JP); Yuji Sasaki, Tokyo (JP); Yoshihito Katsu, Tokyo (JP); Hikaru Sugiura, Tokyo (JP)

( * ) Notice: Subject to any disclaimer, the term of this patent is extended or adjusted under 35 U.S.C. 154(b) by 228 days.

(21) Appl. No.: 18/190,976

(22) Filed: Mar. 28, 2023

(65) Prior Publication Data

US 2023/0231431 A1 Jul. 20, 2023

Related U.S. Application Data

(63) Continuation of application No. PCT/JP2021/033515, filed on Sep. 13, 2021.

(30) Foreign Application Priority Data

Sep. 30, 2020 (JP) ................................. 2020-165150

(51) Int. Cl.
| | |
|---|---|
| *H02K 1/28* | (2006.01) |
| *H02K 1/27* | (2022.01) |
| *H02K 7/00* | (2006.01) |
| *H02K 15/03* | (2006.01) |
| *H02K 15/12* | (2006.01) |

(52) U.S. Cl.
CPC .............. *H02K 1/28* (2013.01); *H02K 7/003* (2013.01); *H02K 15/03* (2013.01); *H02K 15/12* (2013.01)

(58) Field of Classification Search
CPC .......... H02K 1/28; H02K 7/003; H02K 15/03; H02K 15/12; H02K 7/14
See application file for complete search history.

(56) References Cited

U.S. PATENT DOCUMENTS

| | | | |
|---|---|---|---|
| 6,072,252 A | 6/2000 | Van Dine et al. | |
| 2007/0108861 A1* | 5/2007 | Aoyama | H02K 1/276 310/156.53 |
| 2010/0109467 A1* | 5/2010 | Aota | H02K 1/276 310/156.53 |

(Continued)

FOREIGN PATENT DOCUMENTS

| | | |
|---|---|---|
| JP | H11-032455 | 2/1999 |
| JP | 2002-233088 | 8/2002 |

(Continued)

OTHER PUBLICATIONS

"Circumference, N." Oxford English Dictionary, Oxford UP, Sep. 2025, https://doi.org/10.1093/OED/8831592005. (Year: 2025).*

(Continued)

*Primary Examiner* — Thomas Truong
(74) *Attorney, Agent, or Firm* — SHIPWAY IP

(57) ABSTRACT

A motor rotor includes a rotatable shaft, and a magnet structure mounted around the shaft. The magnet structure includes magnet pieces including a first magnet piece and a second magnet piece. The first magnet piece has a fracture surface facing the second magnet piece, and an outer surface forming a circumferential surface of the magnet structure. A surface roughness of the fracture surface is greater than a surface roughness of the outer surface of the first magnet piece.

18 Claims, 15 Drawing Sheets

(56)  References Cited

U.S. PATENT DOCUMENTS

| | | | | |
|---|---|---|---|---|
| 2011/0089781 A1 | | 4/2011 | Yoneyama | |
| 2012/0274165 A1* | | 11/2012 | Fukaya | H01F 41/005 |
| | | | | 310/156.01 |
| 2012/0293033 A1* | | 11/2012 | Hisada | H02K 1/2766 |
| | | | | 310/156.01 |
| 2013/0057374 A1* | | 3/2013 | Adachi | H01F 7/0221 |
| | | | | 225/2 |

FOREIGN PATENT DOCUMENTS

| | | | |
|---|---|---|---|
| JP | 2002-359955 | | 12/2002 |
| JP | 2007-060860 | | 3/2007 |
| JP | 2011019311 A | * | 1/2011 |
| JP | 2011-091906 | | 5/2011 |
| JP | 2012-105482 | | 5/2012 |
| JP | 2013-116002 | | 6/2013 |
| JP | 2018-078678 | | 5/2018 |
| WO | 2012/111065 | | 8/2012 |
| WO | 2020/008813 | | 1/2020 |

OTHER PUBLICATIONS

International Search Report dated Nov. 16, 2021 for PCT/JP2021/033515.
International Preliminary Report on Patentability with Written Opinion dated Apr. 13, 2023 for PCT/JP2021/033515.

\* cited by examiner

S02

S03

S05

S06

MOTOR ROTOR WITH FRACTURED MAGNET

CROSS-REFERENCE TO RELATED APPLICATIONS

This application is a continuation application of PCT Application No. PCT/JP2021/033515, filed on Sep. 13, 2021, which claims the benefit of priority from Japanese Patent Application No. 2020-165150, filed on Sep. 30, 2020 the entire contents of which are incorporated herein by reference.

BACKGROUND

Japanese Unexamined Patent Publication No. 2007-60860 and Japanese Unexamined Patent Publication No. 2002-359955 describe motor rotors for rotating machines such as turbochargers. For example, the permanent magnet rotor disclosed in Japanese Unexamined Patent Publication No. 2007-60860 has permanent magnet pieces made of sintered magnet accommodated between a smooth layer and an inner wall of a magnet-inserting opening.

SUMMARY

An example motor rotor may include a rotating shaft, an inner sleeve disposed on an outer circumferential surface of the rotating shaft, and a magnet structure disposed on an outer circumferential surface of the inner sleeve. The magnet structure may include magnet pieces disposed so as to cover the outer circumferential surface of the inner sleeve, and a resin member injected between the inner sleeve and the magnet pieces and between the magnet pieces. The magnet pieces are fractured pieces and may have different shapes from each other.

DETAILED DESCRIPTION

Figure 1:
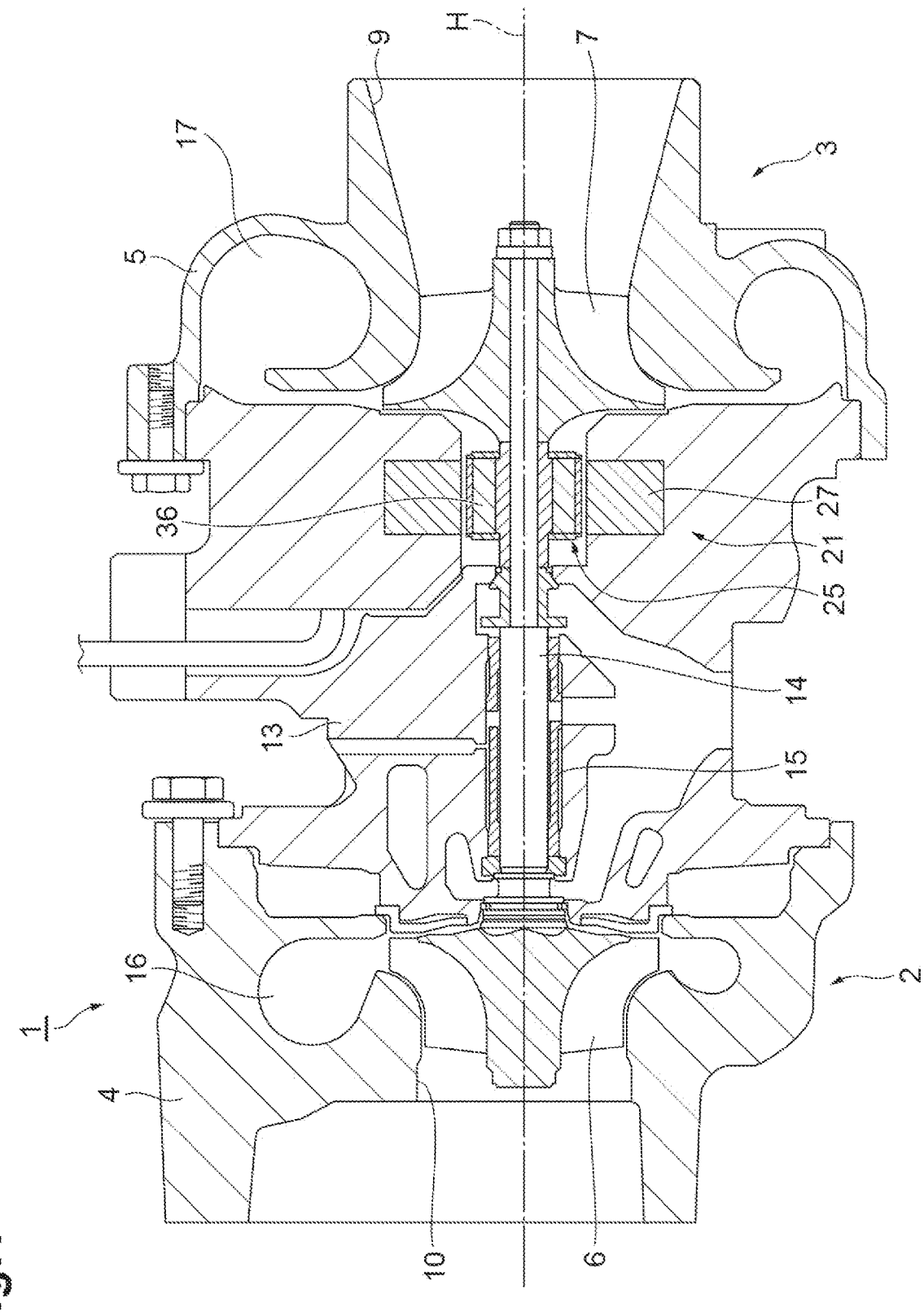
FIG. 1 is a cross-sectional view of a turbocharger including a motor rotor.

An example motor rotor may include a rotating shaft, an inner sleeve disposed on an outer circumferential surface of the rotating shaft, and a magnet structure disposed on an outer circumferential surface of the inner sleeve. The magnet structure includes magnet pieces disposed so as to cover the outer circumferential surface of the inner sleeve, and a resin member injected between the inner sleeve and the magnet pieces and between the magnet pieces. At least one of the magnet pieces has a shape different from the shapes of the other magnet pieces.

In some examples, the magnet structure includes the magnet pieces. The magnet pieces are bonded to each other by the resin member. The resin member is also injected between the inner sleeve and the magnet structure. To obtain such configurations, the inner sleeve and a substantially cylindrical magnet are first disposed in a mold. A pressure greater than the pressure that fractures the magnet is then applied to an uncured resin. Cracks (or fractures) are formed in the magnet by applying a pressure greater than the pressure that fractures the magnet to the uncured resin, so that the magnet pieces can be formed. The magnet pieces can be moved so as to conform to an inner circumferential surface of the mold. The magnet pieces can be pressed against the inner circumferential surface of the mold. The inner circumferential surface of the mold is accurately aligned with respect to a rotational axis. By pressing the magnet pieces against the inner circumferential surface of the mold, the axis of the magnet structure including the magnet pieces can be made to coincide with the rotational axis with the same accuracy as the accuracy of alignment of the mold. Thus, the rotational balance of the motor rotor can be improved.

In some examples, a surface roughness of surfaces of the magnet pieces, in contact with the resin member, between the magnet pieces may be greater than a surface roughness of surfaces of the magnet pieces, in contact with the resin member, between the inner sleeve and the magnet pieces. The rotational balance of the motor rotor can be improved also with such a configuration.

In some examples, the outer circumferential surface of the inner sleeve has a groove extending in a direction including a circumferential direction component formed thereon. A gap formed between the inner sleeve and the magnet pieces is filled with a resin. In doing so, the flow of the resin in the direction including the circumferential direction component can be guided by the groove. This facilitates the uniform spreading of the resin in the circumferential direction in the gap.

Pressure can be more evenly applied to the magnet pieces in the circumferential direction by the uniform spreading of the resin being facilitated in the circumferential direction in the gap. As a result, the magnet pieces can be more evenly pressed against the inner circumferential surface of the mold. Thus, the rotational balance of the motor rotor can be improved.

In some examples, the inner sleeve may have a small diameter portion formed on a first end in an axial direction, the small diameter portion being formed to have a smaller diameter than a portion facing an inner circumferential surface of the magnet structure in the axial direction. An inlet for injecting the resin into a first end of the inner sleeve in the axial direction can be widened. Widening the inlet for injecting the resin facilitates the uniform spreading of the resin in the circumferential direction in the gap formed between the inner sleeve and the magnet pieces. As a result, pressure can be applied to the magnet pieces more evenly in the circumferential direction. Since pressure can be applied to the magnet pieces more evenly, the magnet pieces can be more evenly pressed against the inner circumferential surface of the mold. Thus, the rotational balance can be improved.

An example motor rotor production method (or manufacturing method) may include an operation of disposing an inner sleeve and a cylindrical magnet in a mold, and an operation of injecting an uncured resin between the inner sleeve and the magnet. In the operation of injecting the uncured resin, a pressure greater than the pressure that fractures the magnet is applied to the resin.

In some examples, the inner sleeve and the substantially cylindrical magnet are first disposed in the mold. A pressure greater than the pressure that fractures the magnet is then applied to the resin. Cracks are formed in the magnet by applying a pressure greater than the pressure that fractures the magnet to the resin. The cracks in the magnet form magnet pieces from the cylindrical magnet and enables the magnet pieces to be pressed against the mold. An inner circumferential surface of the mold is accurately aligned with respect to a rotational axis. The magnet pieces pressed against the inner circumferential surface of the mold can thus form a magnet structure having the same accuracy as the accuracy of alignment of the mold since the inner circumferential surface of the mold is accurately aligned with respect to the rotational axis. Consequently, the rotational balance of the motor rotor can be improved.

In some examples, in the operation of disposing the inner sleeve and the cylindrical magnet in the mold, a gap may be formed between the inner circumferential surface of the mold and an outer circumferential surface of the magnet by disposing the magnet having an outer diameter smaller than an inner diameter of the mold. In the operation of injecting the uncured resin, after the magnet is fractured by the pressure of the resin being injected, the pressure may continue to be applied to the resin. The gap is formed between the inner circumferential surface of the mold and the outer circumferential surface of the magnet. The gap is a clearance in which the magnet can move. As a result, the magnet can be disposed so as to conform to the shape of the inner circumferential surface of the mold which is accurately aligned with respect to the rotational axis. After the magnet is fractured by the resin being injected, the pressure can be continued to be applied to the resin. As a result, the magnet can be more reliably pressed against the inner circumferential surface of the mold. Thus, the rotational balance can be improved.

Hereinafter, with reference to the drawings, the same elements or similar elements having the same function are denoted by the same reference numerals, and redundant description will be omitted.

FIG. 1 is a cross-sectional view of a turbocharger 1 including a motor rotor 25 of the present disclosure. The turbocharger 1 is a vehicle turbocharger provided with the motor rotor 25. In the following description, an "axial direction" refers to the axial direction of a rotating shaft 14 described below. A "radial direction" refers to the radial direction of the rotating shaft 14. A "circumferential direction" refers to the circumferential direction of the rotating shaft 14.

The turbocharger 1 is applied to an internal combustion engine of a vehicle or the like. The turbocharger 1 is used for intake and compression of outside air. As illustrated in FIG. 1, the turbocharger 1 includes a turbine 2 provided on a first end of the turbocharger 1, and a compressor 3 provided on a second end of the turbocharger 1. The turbocharger 1 is provided with the rotating shaft 14 having a rotational axis H. The rotating shaft 14 is inserted through the turbine 2 and the compressor 3. The rotating shaft 14 is accommodated in a bearing housing 13. The bearing housing 13 is provided between the turbine 2 and the compressor 3. A bearing 15 is disposed on an inner circumferential surface of the bearing housing 13. The rotating shaft 14 is rotatably supported by the bearing housing 13 via the bearing 15.

The turbine 2 rotates the rotating shaft 14 using exhaust gas discharged from the internal combustion engine. The turbine 2 includes a turbine housing 4 and a turbine wheel 6. The turbine wheel 6 is accommodated in the turbine housing 4. The turbine housing 4 is provided with an exhaust gas inlet and an exhaust gas outlet 10. The exhaust gas outlet 10 is open toward a first end of the turbine 2. The turbine wheel 6 is mounted on a first end of the rotating shaft 14. A scroll passage 16 that extends in the circumferential direction is provided around the turbine wheel 6. The turbine 2 causes the exhaust gas of the internal combustion engine to flow from the exhaust gas inlet into the turbine housing 4. As a result, the turbine 2 rotates the turbine wheel 6 and the rotating shaft 14 by the exhaust gas. The turbine 2 causes the exhaust gas to flow outside of the turbine housing 4 from the exhaust gas outlet 10.

The compressor 3 compresses outside air. The compressor 3 supplies the compressed air to the internal combustion engine. The compressor 3 includes a compressor housing 5 and a compressor wheel 7. The compressor wheel 7 is accommodated in the compressor housing 5. The compressor housing 5 is provided with an outlet port and an inlet port 9. The inlet port 9 is open toward a second end of the compressor 3. The compressor wheel 7 is mounted on a second end of the rotating shaft 14. A scroll passage 17 that extends in the circumferential direction is provided around the compressor wheel 7. The compressor 3 rotates the compressor wheel 7 by the drive of the turbine 2. The compressor 3 causes outside air to be sucked into the compressor housing 5 from the inlet port 9. The compressor 3 causes the air to flow into the scroll passage 17. The air compressed by the compressor 3 is discharged from the outlet port. The discharged air is supplied to the internal combustion engine mentioned above.

The turbocharger 1 has an electric motor 21. The electric motor 21 applies torque to the rotating shaft 14 when the torque generated resulting from the exhaust gas of the internal combustion engine falls short of the required torque such as during acceleration of the vehicle on which the turbocharger 1 is mounted. For example, a brushless DC motor may be used as the electric motor 21. The electric motor 21 has the motor rotor 25 and a motor stator 27 which includes coils and cores.

The motor rotor 25 is accommodated inside the compressor housing 5. The motor rotor 25 is disposed between the bearing 15 and the compressor wheel 7 along the axial direction. The motor rotor 25 is fixed to the rotating shaft 14. The motor rotor 25 is rotatable together with the rotating shaft 14. The motor stator 27 is accommodated inside the compressor housing 5. The motor stator 27 is disposed in a position substantially the same as that of the motor rotor 25 along the axial direction. The motor stator 27 surrounds the motor rotor 25. The motor stator 27 is disposed in the compressor housing 5. An inner circumferential surface of the motor stator 27 is spaced from an outer circumferential surface of the motor rotor 25. The configuration of the motor rotor 25 will be described below.

Figure 2:
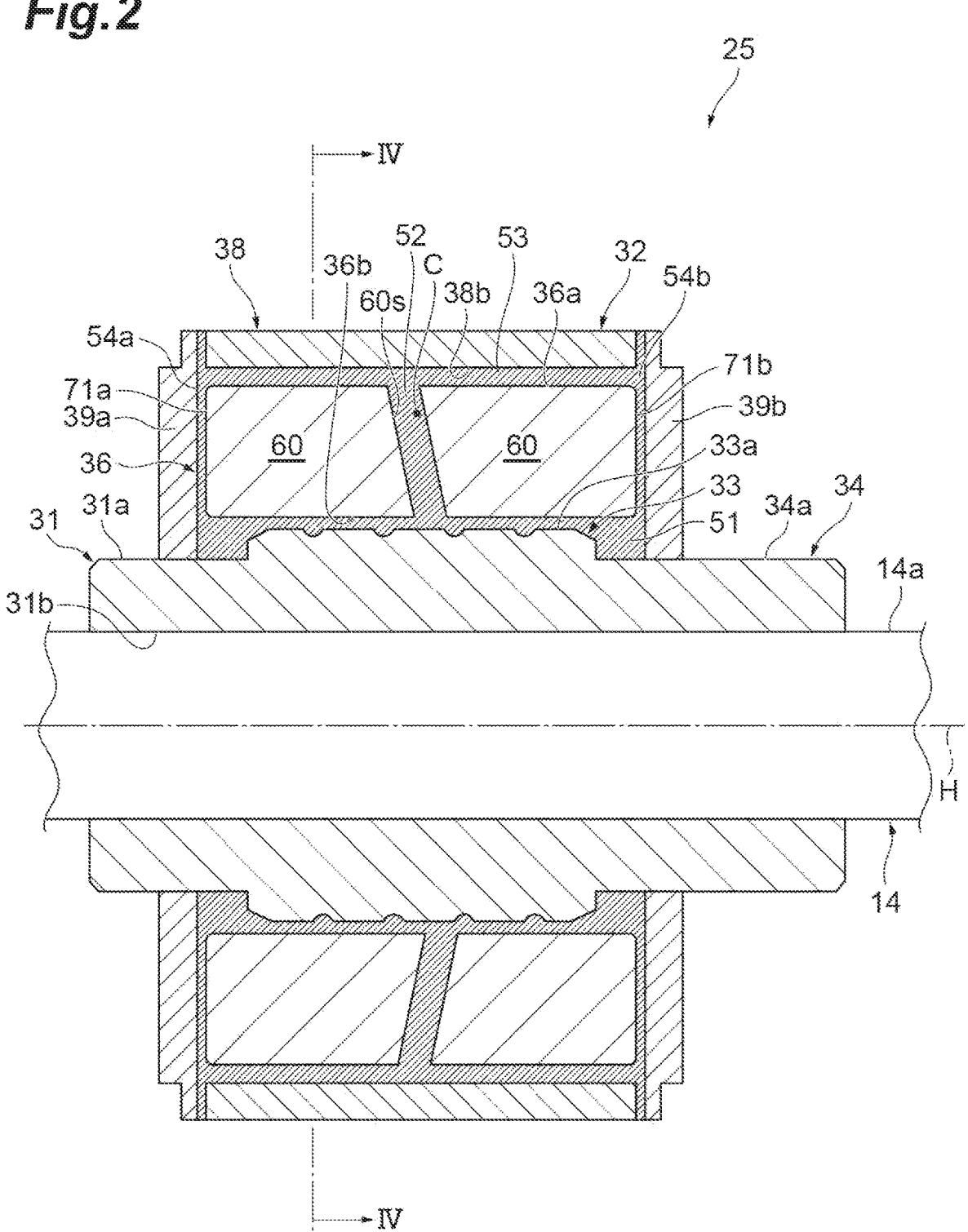
FIG. 2 is a schematic cross-sectional view illustrating the motor rotor illustrated in FIG. 1.

FIG. 2 is a cross-sectional view focusing on the motor rotor 25 illustrated in FIG. 1. As illustrated in FIG. 2, the motor rotor 25 is an assembly including an inner sleeve 31 and a magnet structure 32. The motor rotor 25 has a substantially cylindrical shape. The rotational axis of the motor rotor 25 coincides with the rotational axis H of the rotating shaft 14.

The inner sleeve 31 is a substantially cylindrical member disposed on an outer circumferential surface 14a of the rotating shaft 14. An inner circumferential surface 31b of the inner sleeve 31 is in contact with the outer circumferential surface 14a of the rotating shaft 14. The inner sleeve 31 has a large diameter portion 33, a base body portion 34, and a small diameter portion 35 (see FIG. 3). The large diameter portion 33 is provided in the center portion in the axial direction. The base body portion 34 forms both ends in the axial direction. The small diameter portion 35 is formed between the large diameter portion 33 and the base body portion 34.

The magnet structure 32 is in contact with an outer circumferential surface 31a of the inner sleeve 31. The length of the magnet structure 32 along the axial direction is greater than the length of the large diameter portion 33 of the inner sleeve 31. The magnet structure 32 is disposed so as to surround the large diameter portion 33 of the inner sleeve 31. As illustrated in FIG. 2, the magnet structure 32 includes a magnet portion 36, a protective layer 38, an end ring 39a, and an end ring 39b. A first resin portion 51 is formed between an inner circumferential surface 36b of the magnet portion 36 and an outer circumferential surface 33a of the large diameter portion 33.

The magnet portion 36 has a substantially cylindrical shape. The magnet portion 36 includes magnet pieces 60 and a second resin portion 52. The magnet portion 36 is disposed so as to surround the large diameter portion 33 of the inner sleeve 31. A crack group (also referred to herein as cracks or fractures) C is formed in the magnet portion 36. The second resin portion 52 is formed in the cracks of the crack group C.

The crack group C will be described further below. The first resin portion 51 and the second resin portion 52 constitute a resin member.

The protective layer 38 is a metal member having a substantially cylindrical shape. The protective layer 38 is disposed so as to surround the magnet portion 36. The protective layer 38 may be referred to as an "armor ring." The protective layer 38 is disposed so as to prevent scattering of the magnet portion 36 during operation of the turbocharger 1. A third resin portion 53 is formed between an inner circumferential surface 38b of the protective layer 38 and an outer circumferential surface 36a of the magnet portion 36. The length of the protective layer 38 along the axial direction is substantially the same as the length of the magnet portion 36.

The end ring 39a and the end ring 39b are substantially annular members. The end ring 39a and the end ring 39b suppress misalignment of the magnet portion 36 and the protective layer 38 along the axial direction. The end ring 39a forms one end of the magnet structure 32 along the axial direction. The end ring 39b forms another end of the magnet structure 32 along the axial direction. A fourth resin portion 54a is formed between the end ring 39a and the magnet portion 36. The fourth resin portion 54a is also for lied between the end ring 39a and the protective layer 38. A fourth resin portion 54b is formed between the end ring 39b and the magnet portion 36. The fourth resin portion 54b is also formed between the end ring 39b and the protective layer 38. The end ring 39a and the end ring 39b are disposed so as to contact the outer circumferential surface 34a of the base body portion 34 of the inner sleeve 31. The end ring 39a and the end ring 39b are disposed so as to enclose the large diameter portion 33 of the inner sleeve 31 along the axial direction. The outer diameter of the end ring 39a and the outer diameter of the end ring 39b are substantially the same as the outer diameter of the protective layer 38.

For example, steel such as SCM435H may be employed as the material for the inner sleeve 31. For example, neodymium magnet (Nd—Fe—B) or samarium cobalt magnet may be employed as the material for the magnet portion 36. A metal material (for example, non-magnetic metal such as Ti-6Al-4V) or a resin material may be employed as the material for the protective layer 38. For example, non-magnetic metal such as SUS, thermosetting resin, and thermoplastic resin may be employed as the material for the end ring 39a and the end ring 39b.

Thermosetting resin, thermoplastic resin, and the like may be employed as the material for the first resin portion 51, the second resin portion 52, the third resin portion 53, and the fourth resin portions 54a, 54b. A phenol resin or epoxy resin which are thermosetting resin may be employed as the material for the first resin portion 51, the second resin portion 52, the third resin portion 53, and the fourth resin portions 54a, 54b. Liquid crystal polymer (LCP) which is thermoplastic resin may be employed as the material for the first resin portion 51, the second resin portion 52, the third resin portion 53, and the fourth resin portions 54a, 54b. Testing by the inventors has shown that LCP has a higher fluidity during injection molding than phenol resin. LCP is relatively easily available compared to phenol resin. LCP is thus preferable as the material for the first resin portion 51, the second resin portion 52, the third resin portion 53, and the fourth resin portions 54a, 54b. Phenol resin has excellent heat resistance, rigidity, and resistance to environment compared to LCP. Phenol resin is thus preferable as the material for the first resin portion 51, the second resin portion 52, the third resin portion 53, and the fourth resin portions 54a, 54b. Epoxy resin has adhesive properties in the material itself, and is thus preferable as the material for the first resin portion 51, the second resin portion 52, the third resin portion 53, and the fourth resin portions 54a, 54b.

Figure 3:
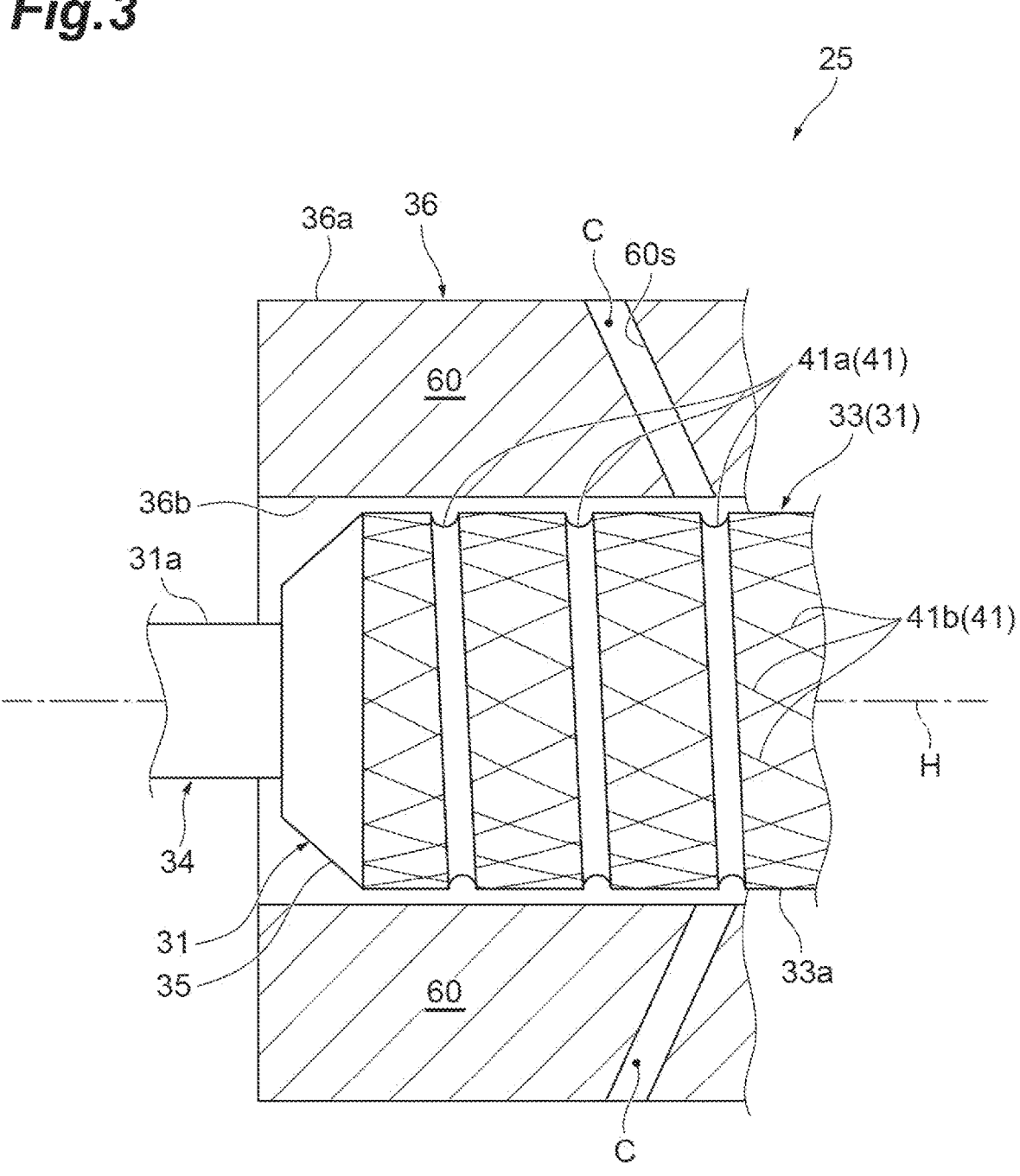
FIG. 3 is a diagram illustrating an example configuration of an inner sleeve and magnet pieces.

FIG. 3 is a diagram illustrating an example of the configuration of the inner sleeve 31 and the magnet pieces 60. FIG. 3 schematically illustrates a side view of inner sleeve 31 with a cross-section of the magnet pieces 60 of the motor rotor 25.

As illustrated in FIG. 3, grooves 41 extending in a direction including a circumferential direction component are formed in the outer circumferential surface 33a of the large diameter portion 33, so as to be recessed with respect to the outer circumferential surface 33a. The grooves 41 include a circumferential groove 41a and knurl grooves 41b. The circumferential groove 41a extends in the circumferential direction. The circumferential groove 41a is formed having regular intervals along the axial direction. The knurl grooves 41b extend helically along the axial direction. The knurl grooves 41b extend in two directions so as to intersect each other. The knurl grooves 41b form a criss-cross pattern by extending in two directions so as to intersect each other. With further reference to FIG. 2, the first resin portion 51 extends substantially in the axial direction to fill a gap between the magnet pieces 60 and the outer circumferential surface 33a (e.g., an outermost circumferential surface) of the sleeve 31 and additionally extends radially inwardly from the outer circumferential surface 33a into the grooves 41.

The small diameter portion 35 is formed between the large diameter portion 33 and the base body portion 34 at a first end of the inner sleeve 31. The outer diameter of the small diameter portion (or tapered portion) 35 is decreased as it gets closer to the first end of the inner sleeve 31. The small diameter portion 35 has a tapered shape.

Figure 4:
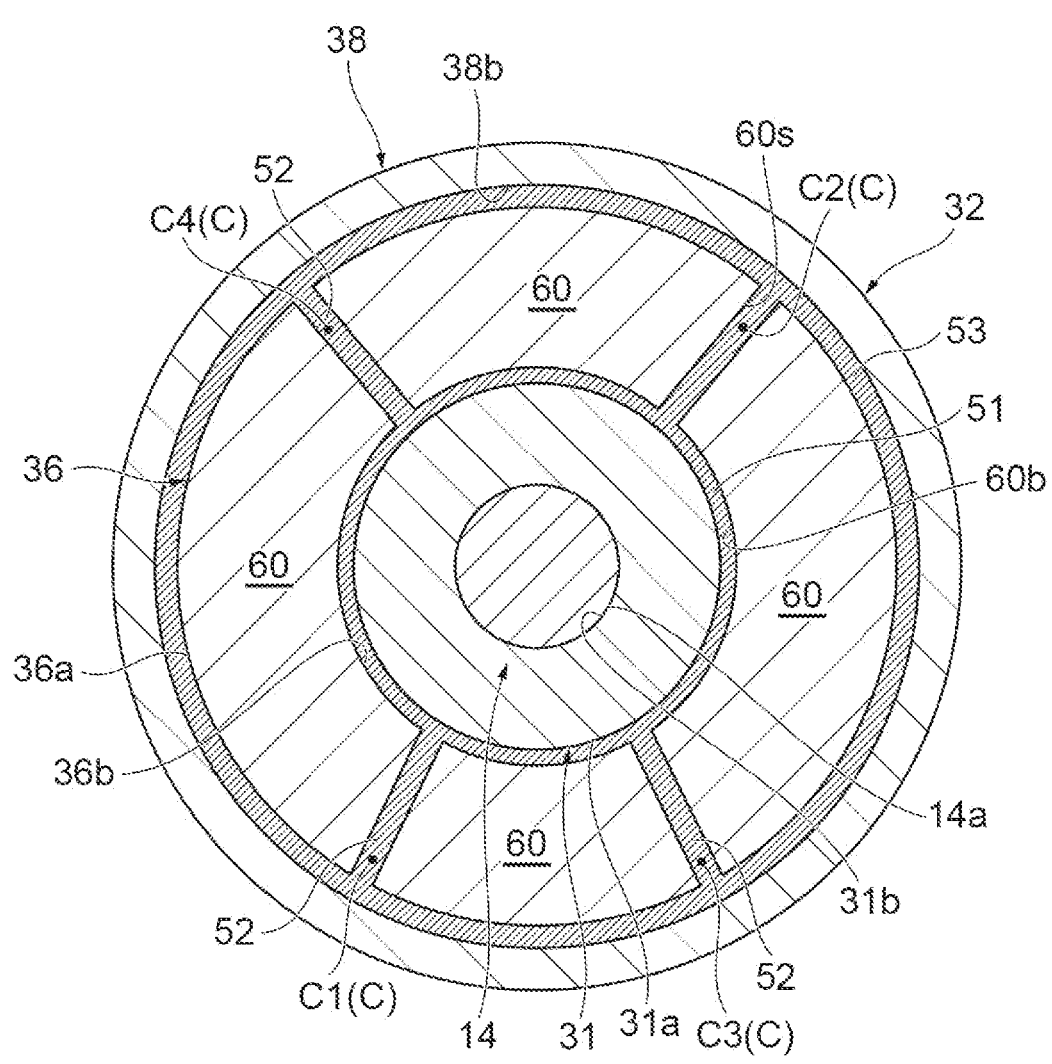
FIG. 4 is a cross-sectional view of the motor rotor illustrated in FIG. 2, taken along line IV-IV.

FIG. 4 is a schematic cross-sectional view taken along line IV-IV in FIG. 2. As mentioned above, a crack group C is formed in the magnet portion 36. As illustrated in FIG. 4, the crack group C includes a first crack C1, a second crack C2, a third crack C3, and a fourth crack C4 when viewed in the axial direction. The second crack C2 is formed in a position opposite the first crack C1. The third crack C3 is formed between the first crack C1 and the second crack C2 along the circumferential direction. The fourth crack C4 is formed in a position opposite the third crack C3. For example. the first crack C1 is formed so as to reach the outer circumferential surface 36a of the magnet portion 36 from the inner circumferential surface 36b of the magnet portion 36. The second crack C2, the third crack C3, and the fourth crack C4 are also formed so as to reach the outer circumferential surface 36a of the magnet portion 36 from the inner circumferential surface 36b of the magnet portion 36. Namely, inner circumferential surfaces 60b of the magnet pieces 60 and radial inner edges 52b of the resin portions 52 form the inner circumferential surface 36b of the magnet portion 36. Additionally, outer circumferential surfaces 60c of the magnet pieces 60 and radial outer edges 52c of the resin portions 52 form the outer circumferential surface 36a of the magnet portion 36, so as to face the inner circumferential surface 38b of the protective layer 38.

Figure 5:
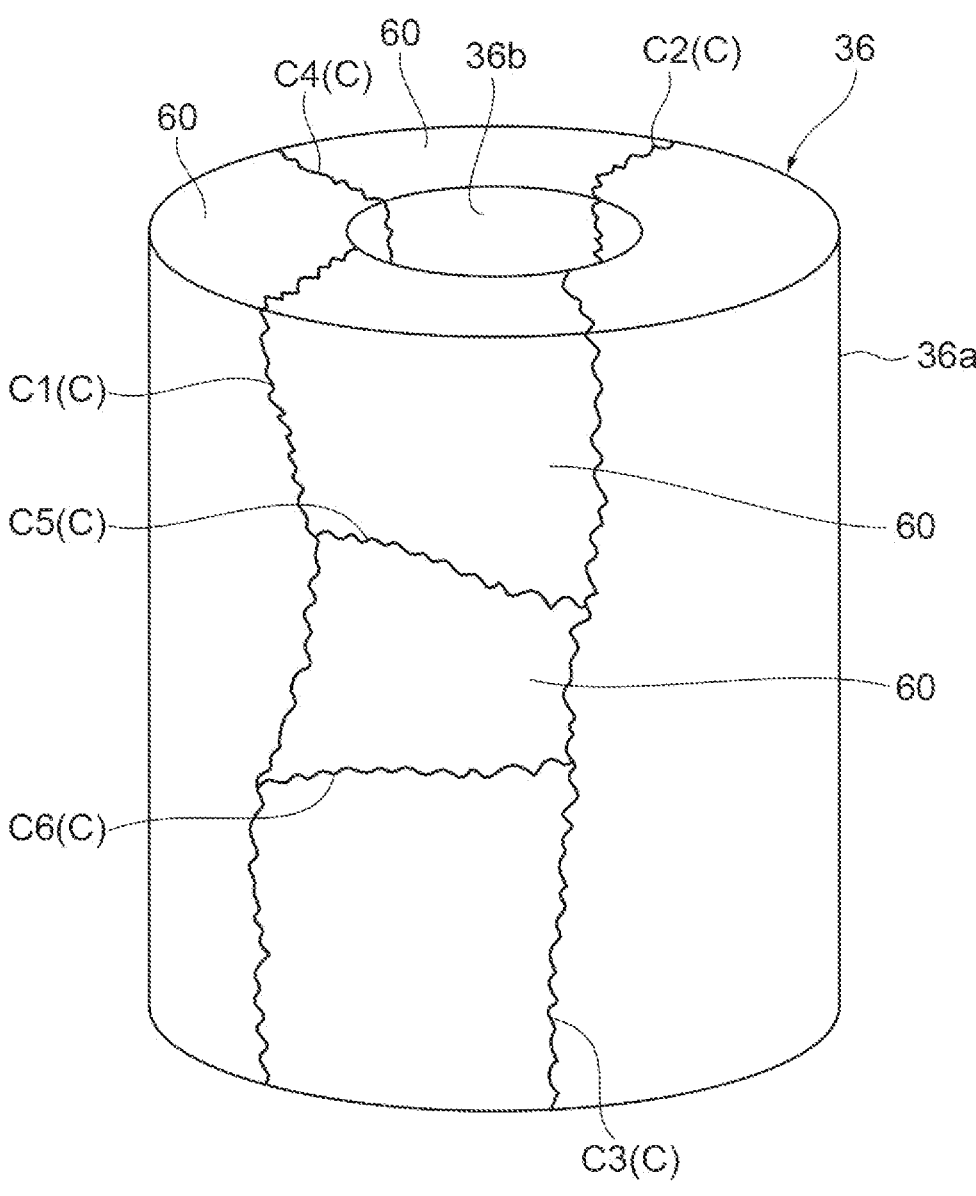
FIG. 5 is a schematic perspective view illustrating a fractured magnet portion according to an example.

The crack group C is formed by brittle fracture of a permanent magnet 70 (see FIG. 7) by a method for producing the motor rotor 25 described further below, so as to form fractured magnet pieces 60. The cracks C1, C2, C3 and C4 are extend substantially radially so as to arrange magnet pieces 60 in a circumferential direction. Each of the cracks C1, C2, C3 and C4, extends between adjacent pairs of fractured magnet pieces 60 which have respective fracture surfaces 60s that face each other so as to interpose the resin portion 52 between the two fracture surfaces 60s. The fracture surfaces 60s may include surface irregularities 61 as schematically illustrated in FIG. 5, resulting from the brittle fracture that the permanent magnet 70 is subjected to. Accordingly, the shape of the fracture surface 60s of a given magnet piece 60 may be complementary (or matching with) the facing fracture surface 60s of an adjacent magnet piece 60. Due to the brittle fracture of the permanent magnet 70, the surface roughness of the fracture surfaces 60s of the magnet pieces 60 is greater than the surface roughness of the inner circumferential surfaces 60b of the magnet pieces 60. In addition, the surface roughness of the fracture surfaces 60s of the magnet pieces 60 is greater than the surface roughness of the outer circumferential surfaces 60c of the magnet pieces 60. In addition, with reference to FIG. 2, the surface roughness of the fracture surfaces 60s of the magnet pieces 60 is greater than the surface roughness of end surfaces 71a, 71b of the magnet pieces 60 that face the end rings 39a and 39b, respectively. The fracture surfaces 60s of the magnet pieces 60 are in contact with the second resin portion 52 injected between the magnet pieces 60. The inner circumferential surfaces 60b of the magnet pieces 60 are in contact with the first resin portion 51 injected between the inner sleeve 31 (see FIG. 2) and the magnet pieces 60. For the "surface roughness" herein, definitions such as arithmetic mean roughness, maximum height, and ten-point mean roughness indicated in JIS B 0601 or the like may be used.

FIG. 5 is a perspective view illustrating an example of the magnet pieces 60. As illustrated in FIG. 5, the crack group C further includes a fifth crack C5 and a sixth crack C6. The fifth crack C5 extends between the first crack C1 and the third crack C3. The fifth crack C5 extends in the circumferential direction. The fifth crack C5 is formed in a position closer to a first end than the sixth crack C6. Accordingly, the fifth crack C5 and a sixth crack C6 separate magnet pieces 60 that are arranged substantially along the axial direction (e.g., parallel to the rotational axis H). The magnet pieces 60 are formed by such crack group C being formed. The magnet pieces 60 are bonded to each other by the second resin portion 52 (see FIG. 2). The magnet pieces 60 thus form the substantially cylindrical magnet portion 36.

Figure 6:
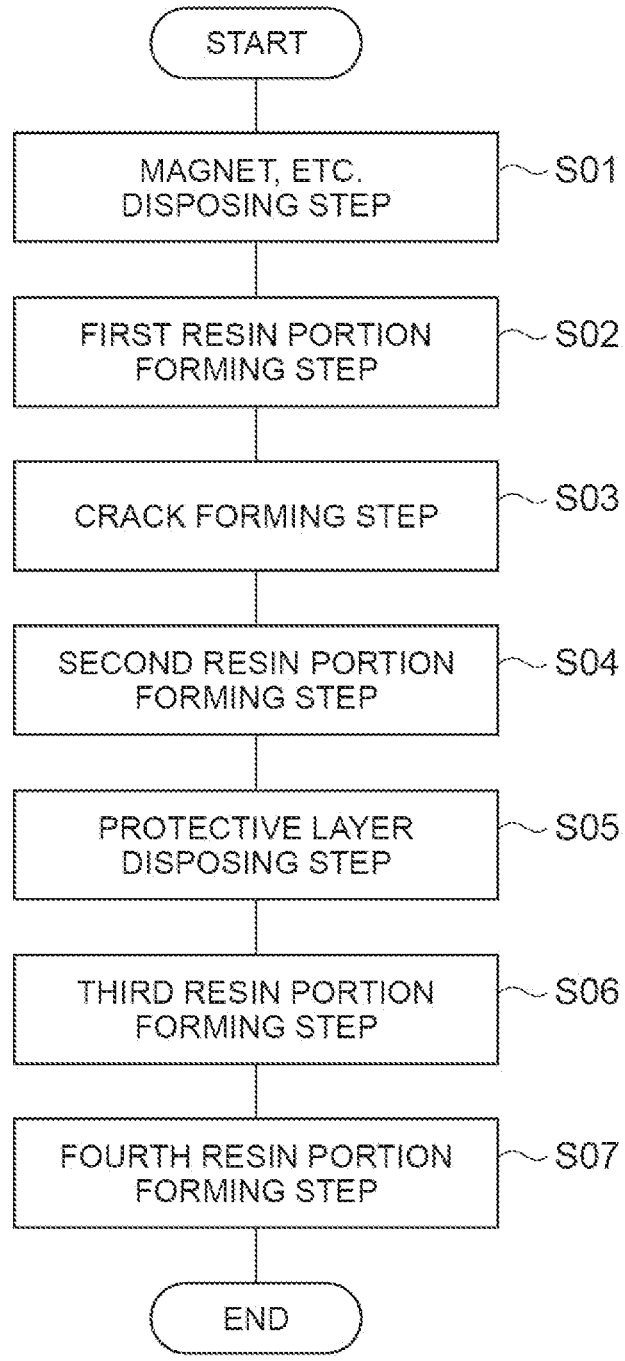
FIG. 6 is a flow chart illustrating an example method of manufacturing a motor rotor.

The method for producing (or method of manufacturing) such motor rotor 25 will next be described. FIG. 6 is a flow chart illustrating the method for producing the motor rotor 25 of the present disclosure. As illustrated in FIG. 6, the method for producing the motor rotor 25 includes a magnet, etc. disposing operation S01, a first resin portion forming operation S02, a crack forming operation S03, a second resin portion forming operation S04, a protective layer disposing operation S05, a third resin portion forming operation S06, and a fourth resin portion forming operation S07.

Figure 7:
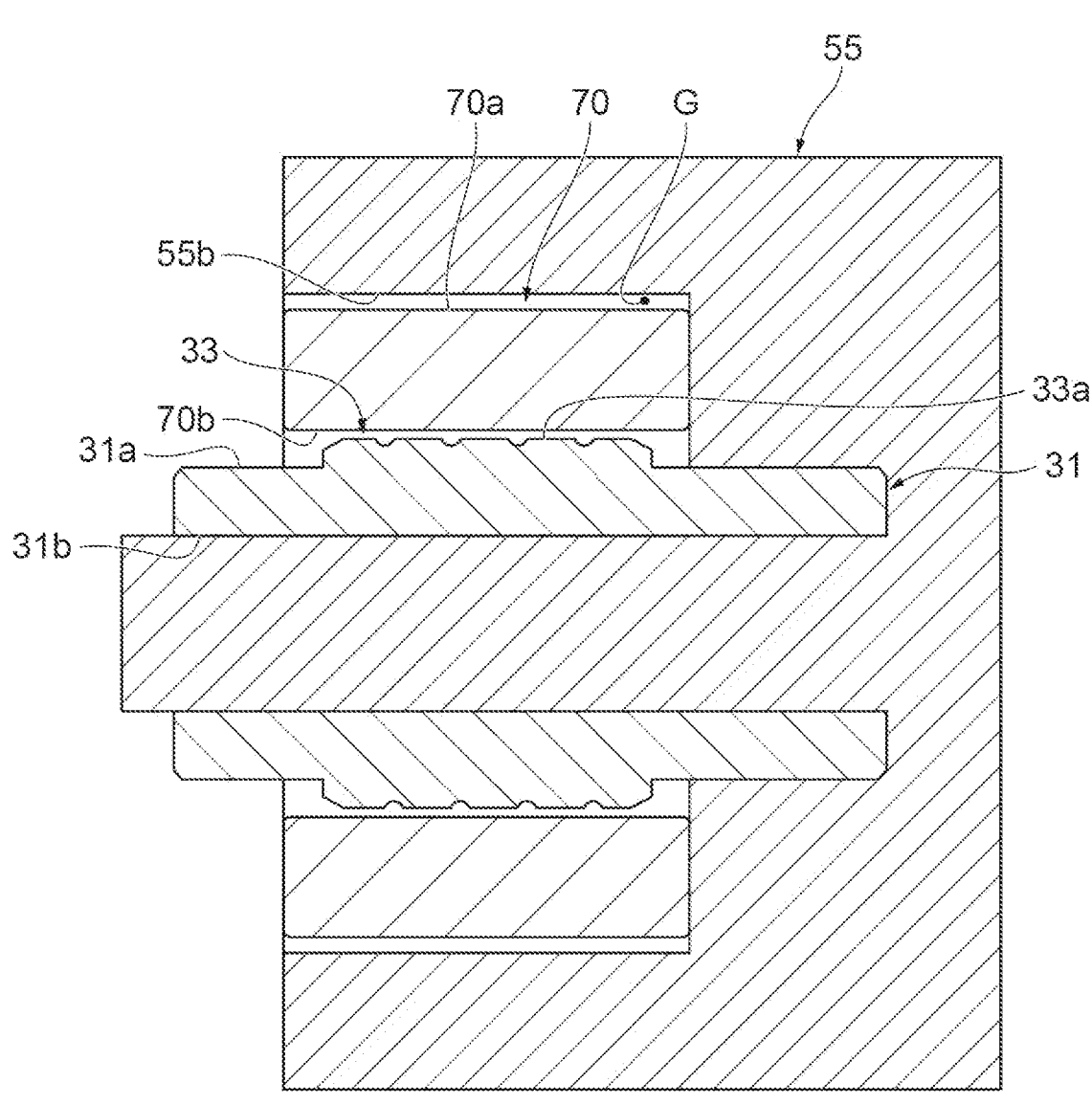
FIG. 7 is a cross-sectional view illustrating an example operation of the method of manufacturing.

FIG. 7 is a cross-sectional view illustrating an example of the magnet, etc. disposing operation S01. As illustrated in FIG. 7, in the magnet, etc. disposing operation S01 (operation of disposing in a mold), the inner sleeve 31 and the substantially cylindrical permanent magnet 70 are disposed in a mold 55. The permanent magnet 70 is disposed so as to surround the large diameter portion 33 of the inner sleeve 31 in the mold 55. An inner circumferential surface 70b of the permanent magnet 70 is spaced from the outer circumferential surface 33a of the large diameter portion 33. An outer circumferential surface 70a of the permanent magnet 70 is spaced from an inner circumferential surface 55b of the mold 55. An end surface of a first end of the permanent magnet 70 is flush with an end surface of a first end of the mold 55. The permanent magnet 70 having an outer diameter smaller than the inner diameter of the mold 55 is disposed. A gap G is formed between the inner circumferential surface 55b of the mold 55 and the outer circumferential surface 70a of the permanent magnet 70 by disposing the permanent magnet 70 having an outer diameter smaller than the inner diameter of the mold 55. The gap G is, for example, formed greater than the dimensional tolerance achievable by the machining of the permanent magnet 70. The gap G absorbs the deviation from the standard dimensions of the permanent magnet 70. It can also be said that the gap G is a clearance sufficient to ensure that the permanent magnet 70 has an ideal outer shape.

Figure 8:
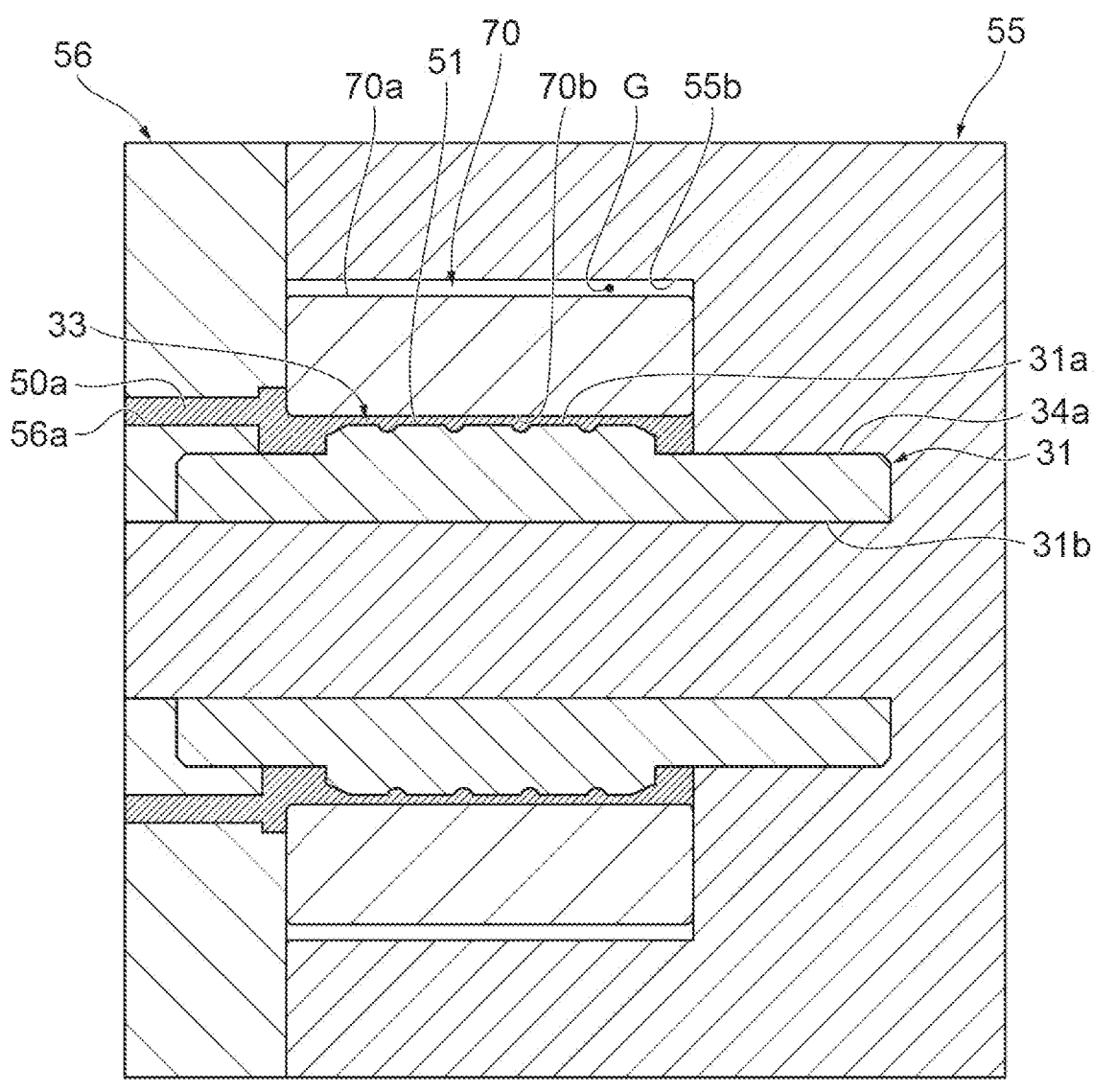
FIG. 8 is a cross-sectional view illustrating another operation of the manufacturing method.

FIG. 8 is a cross-sectional view illustrating an example of the first resin portion forming operation S02. As illustrated in FIG. 8, in the first resin portion forming operation S02 (operation of injecting a resin), a lid 56 is disposed on the first end of the mold 55. An uncured resin 50a is injected between the inner sleeve 31 and the permanent magnet 70. The lid 56 of the mold 55 is provided with an injection port 56a. The injection port 56a communicates a first end of the lid 56 with a second end of the lid 56. In the first resin portion forming operation S02, the uncured resin 50a is injected through the injection port 56a. The uncured resin 50a can be injected between the outer circumferential surface 31a of the inner sleeve 31 and the inner circumferential surface 70*b* of the permanent magnet 70 by injecting the uncured resin 50*a* through the injection port 56*a*. The first resin portion 51 is injection molded by injecting the uncured resin 50*a*. In the first resin portion forming operation S02, a pressure (e.g., an injection pressure) that is less than the pressure that fractures the permanent magnet 70 may be applied to the uncured resin 50*a*.

Figure 9:
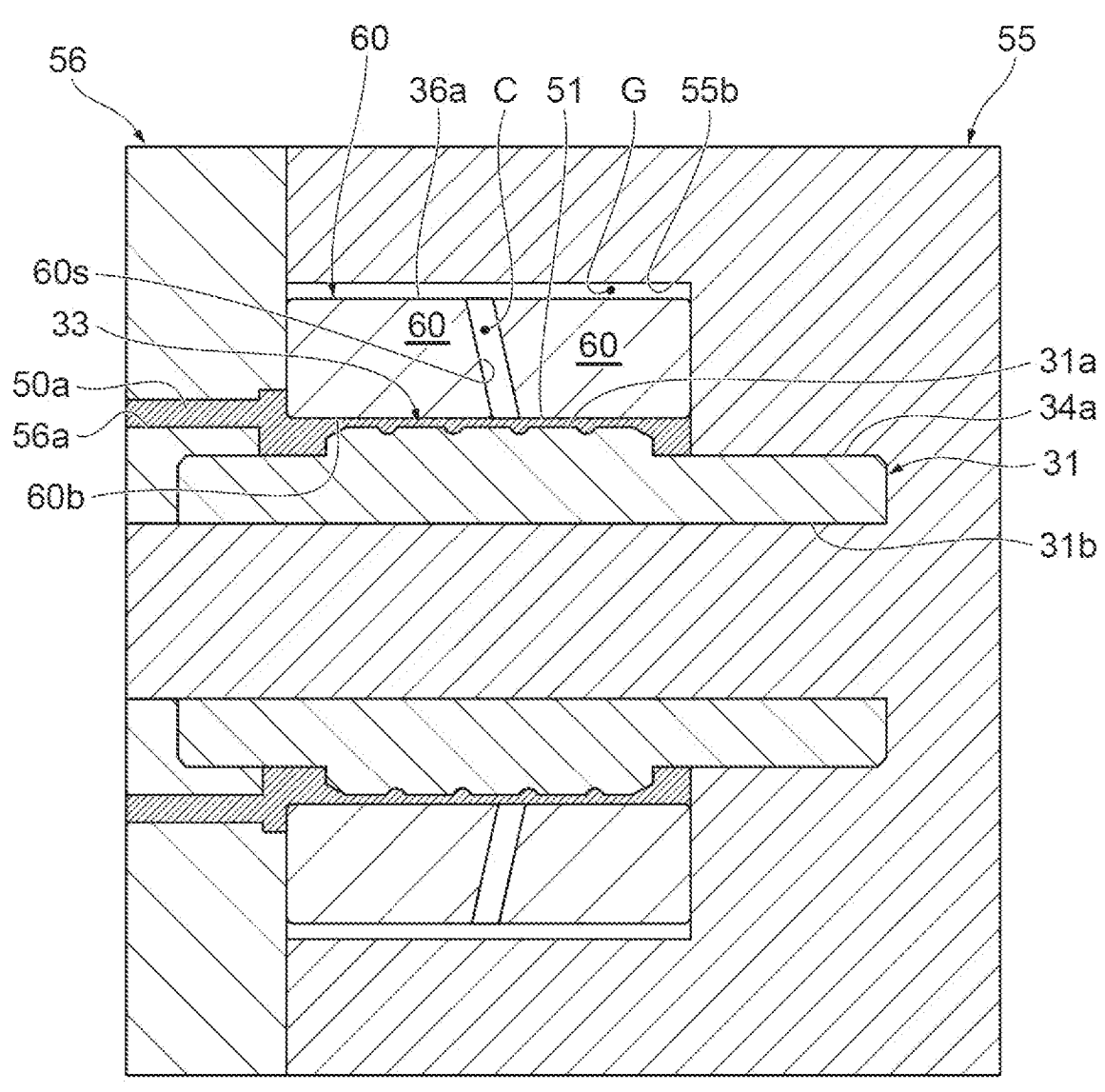
FIG. 9 is a cross-sectional view illustrating another operation the manufacturing method.

FIG. 9 is a cross-sectional view illustrating an example of the crack forming operation S03. In the crack forming operation S03, a pressure (e.g., a fracturing pressure) that is equal to or greater than the pressure that fractures the permanent magnet 70 is applied to the uncured resin 50*a*. The crack group C is formed by applying a pressure greater than the pressure that fractures the permanent magnet 70 to the uncured resin 50*a*. The magnet pieces 60 are formed by forming the crack group C. It should be noted that the permanent magnet 70 is fractured by applying the pressure to the uncured resin 50*a*. The cracks constituting the crack group C thus need not be formed linearly. The crack group C may include junctions at which the cracks join each other. The crack group C may include junctions at which an odd or even number of cracks join each other.

Figure 10:
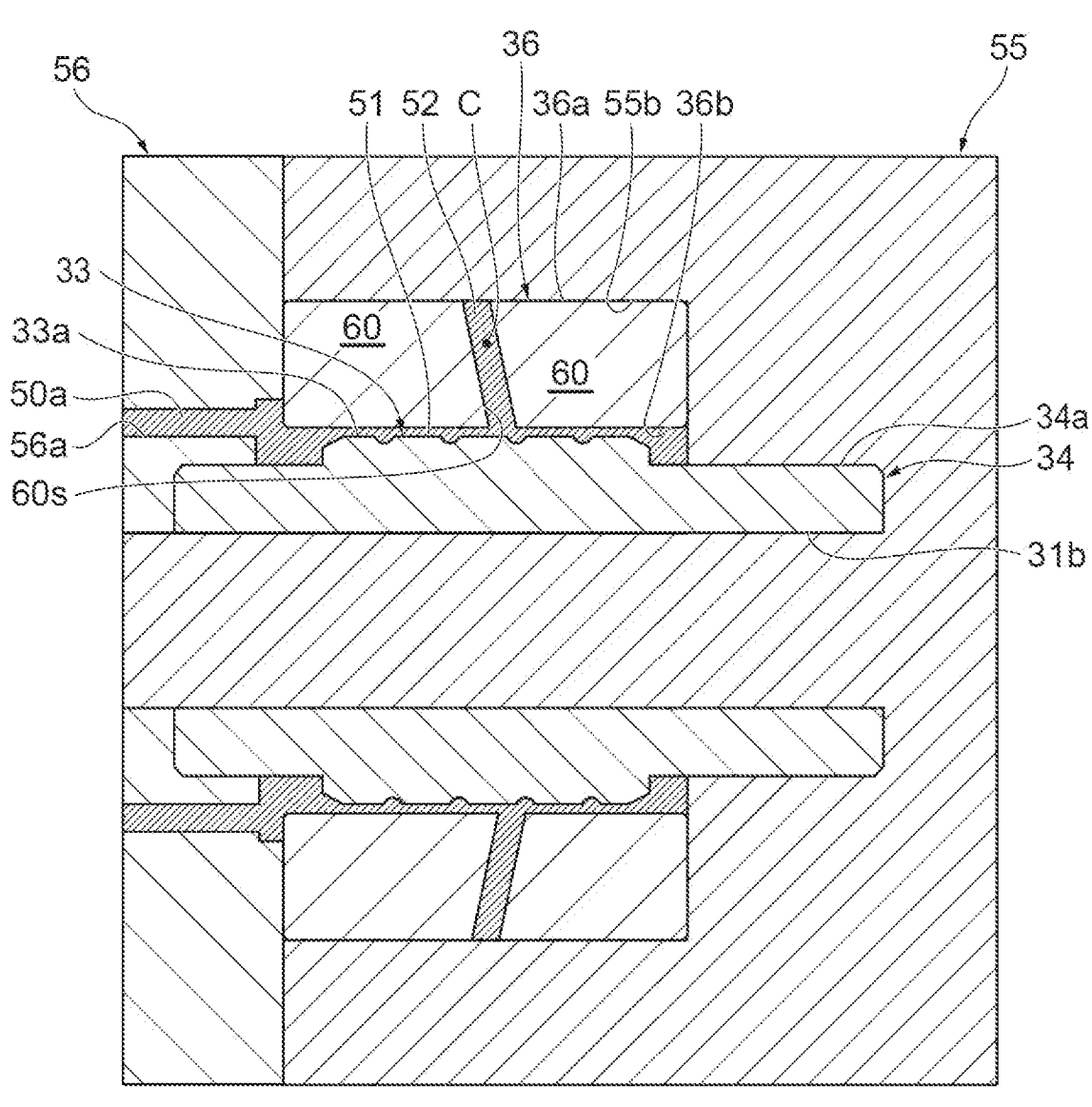
FIG. 10 is a cross-sectional view illustrating another operation of the manufacturing method.

FIG. 10 is a cross-sectional view illustrating an example of the second resin portion forming operation S04. As illustrated in FIG. 10, in the second resin portion forming operation S04, after the magnet pieces 60 are formed by the pressure of the uncured resin 50*a* being injected, the pressure continues to be applied to the uncured resin 50*a*. The pressure at this time (e.g., a filling pressure) may be the same as that in the first resin portion forming operation S02. That is, the pressure that continues to be applied after the magnet pieces 60 are formed may be less than the pressure in the crack forming operation S03. The pressure that continues to be applied after the magnet pieces 60 are formed may also be the same as that in the crack forming operation S03. That is, the pressure that continues to be applied after the magnet pieces 60 are formed need not be changed from the pressure in the crack forming operation S03. The uncured resin 50*a* is injected into the crack group C formed between the magnet pieces 60 by continuing to apply the pressure to the uncured resin 50*a* after the magnet pieces 60 are formed by the pressure of the uncured resin 50*a* being injected. As a result, the second resin portion 52 can be formed. Furthermore, the pressure continues to be applied to the uncured resin 50*a*. As a result, the magnet pieces 60 positioned at the portion in which the gap G is formed move in the radial direction. The magnet pieces 60 are pressed against the inner circumferential surface 55*b* of the mold 55 by the magnet pieces 60 moving in the radial direction. The magnet pieces 60 are thus disposed so as to conform to the shape of the inner circumferential surface 55*b* of the mold 55.

While undergoing the above operations, the uncured resin 50*a* is gradually cured by the heat of the mold 55. The uncured resin 50*a* that has cured is the first resin portion 51. The lid 56 is removed after the first resin portion 51 is formed. An intermediate product which includes the inner sleeve 31 and the magnet portion 36 is then removed from the mold 55.

Figure 11:
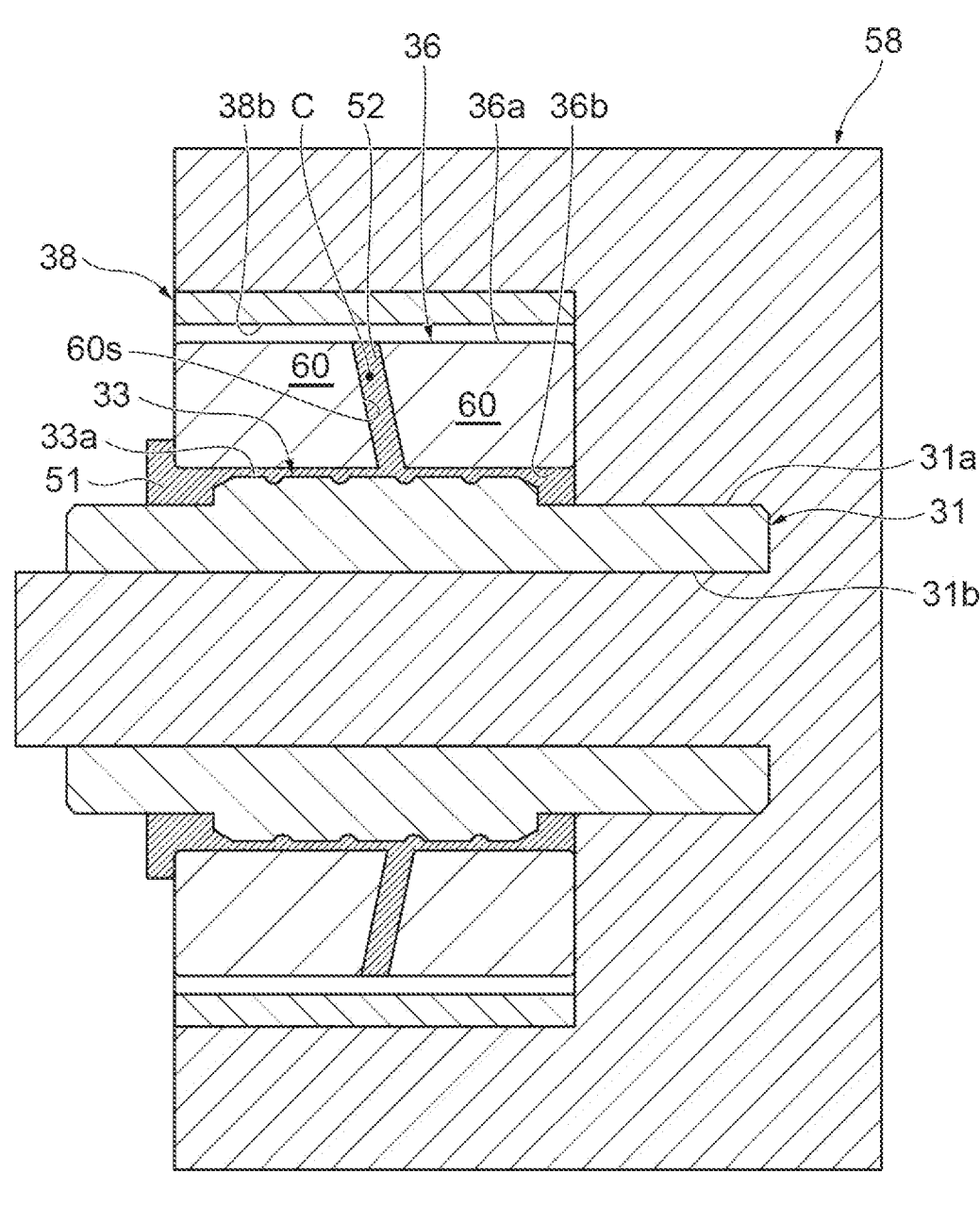
FIG. 11 is a cross-sectional view illustrating another operation of the manufacturing method.

FIG. 11 is a cross-sectional view illustrating an example of the protective layer disposing operation S05. As illustrated in FIG. 11, in the protective layer disposing operation S05, the inner sleeve 31, the magnet portion 36, and the protective layer 38 are disposed inside a mold 58. The magnet portion 36 is bonded to the inner sleeve 31 by the first resin portion 51. The inner diameter of the mold 58 is substantially the same as the outer diameter of the protective layer 38. That is, the inner diameter of the mold 58 is greater than the inner diameter of the mold 55. The protective layer 38 is disposed so as to surround the magnet portion 36. The inner circumferential surface 38*b* of the protective layer 38 is spaced from the outer circumferential surface 36*a* of the magnet portion 36.

Figure 12:
FIG. 12 is a cross-sectional view illustrating another operation of the manufacturing method.

FIG. 12 is a cross-sectional view illustrating an example of the third resin portion forming operation S06. As illustrated in FIG. 12, in the third resin portion forming operation S06, a lid 59 is disposed on a first end of the mold 58. An uncured resin 50*b* is then injected between the magnet portion 36 and the protective layer 38. The lid 59 is provided with an injection port 59*a*. The injection port 59*a* communicates a first end of the lid 59 with a second end of the lid 59. The uncured resin 50*b* is injected through the injection port 59*a*. The third resin portion 53 can be formed between the outer circumferential surface 36*a* of the magnet portion 36 and the inner circumferential surface 38*b* of the protective layer 38 by injecting the uncured resin 50*b* through the injection port 59*a*.

Figure 13:
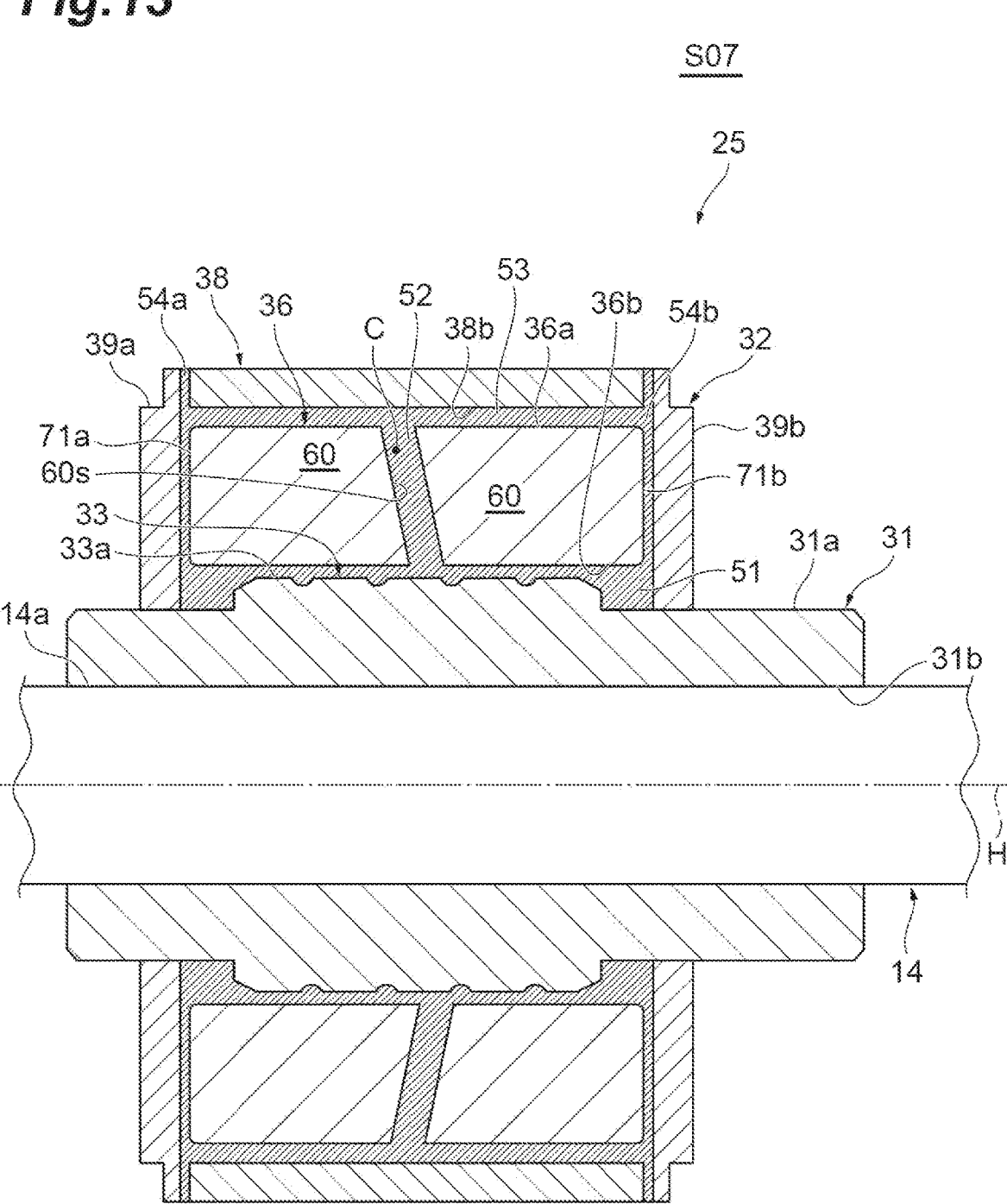
FIG. 13 is a cross-sectional view illustrating another operation of the manufacturing method.

FIG. 13 is a cross-sectional view illustrating an example of the fourth resin portion forming operation S07. As illustrated in FIG. 13, in the fourth resin portion forming operation S07, the inner sleeve 31, the magnet portion 36, the protective layer 38, the first resin portion 51, the second resin portion 52, and the third resin portion 53 are first removed from the mold 58. The rotating shaft 14 is then inserted through the inner sleeve 31. Subsequently, a first end of the first resin portion 51 and a first end of the third resin portion 53 are polished. The first end of the first resin portion 51 is polished so as to be flush with an end surface of a first end of the magnet portion 36 and an end surface of a first end of the protective layer 38, and the first end of the third resin portion 53 is polished so as to be flush with the end surface of the first end of the magnet portion 36 and the end surface of the first end of the protective layer 38. Thereafter, one end surface 71*a* is formed. A second end of the first resin portion 51 is polished so as to be flush with an end surface of a second end of the magnet portion 36. A second end of the third resin portion 53 is polished so as to be flush with an end surface of a second end of the protective layer 38. Thereafter, another end surface 71*b* is formed. Subsequently, an uncured resin is applied to the one end surface 71*a*. The uncured resin is also applied to the other end surface 71*b*. Next, the end ring 39*a* and the end ring 39*b* are press-fit onto the inner sleeve 31. The end ring 39*a* and the end ring 39*b* are then pressed against the uncured resin. As a result, the fourth resin portions 54*a*, 54*b* can be formed. The motor rotor 25 illustrated in FIG. 2 is obtained through such operations.

The magnet structure 32 of the motor rotor 25 includes the magnet pieces 60. The magnet pieces 60 are bonded to each other by the second resin portion 52. The first resin portion 51 is also injected between the inner sleeve 31 and the magnet structure 32. To obtain such a configuration, the inner sleeve 31 and the substantially cylindrical permanent magnet 70 are first disposed in the mold 55. A pressure greater than the pressure that fractures the permanent magnet 70 is then applied to the uncured resin 50*a*. The crack group C is formed in the permanent magnet 70 by applying a pressure greater than the pressure that fractures the permanent magnet 70 to the uncured resin 50*a*, so that the magnet pieces 60 can be formed. The magnet pieces 60 can be pressed against the mold 55. As a result, the motor rotor 25 is obtained. The inner circumferential surface 55*b* of the mold 55 is accurately aligned with respect to the rotational axis H. Thus, the magnet structure 32 can also be configured with the same accuracy as the accuracy of alignment of the mold 55 by pressing the magnet pieces 60 against the inner circumferential surface 55b of the mold 55. Consequently, the rotational balance of the motor rotor 25 can be improved.

The surface roughness of the fracture surfaces 60s of the magnet pieces 60 in contact with the second resin portion 52 injected between the magnet pieces 60 is greater than the surface roughness of the inner circumferential surfaces 60b of the magnet pieces 60 in contact with the first resin portion 51 injected between the inner sleeve 31 and the magnet pieces 60. The rotational balance of the motor rotor 25 can also be improved with such a configuration.

At the outer circumferential surface 31a of the inner sleeve 31, the uncured resin 50a is injected in a gap formed between the permanent magnet 70 and the inner sleeve 31 on which the grooves 41 extending in the direction including the circumferential direction component are formed. In doing so, the flow of the uncured resin 50a in the direction including the circumferential direction component can be guided by the grooves 41. This facilitates the uniform spreading of the uncured resin 50a in the circumferential direction in the gap. Pressure can be more evenly applied to the magnet pieces 60 in the circumferential direction by the uniform spreading of the uncured resin 50a in the circumferential direction being facilitated in the gap. As a result, the magnet pieces 60 can be more evenly pressed against the inner circumferential surface 55b of the mold 55. Thus, the rotational balance of the motor rotor 25 can be improved.

The small diameter portion 35 which is formed so as to have a diameter smaller than that of the large diameter portion 33 is formed on the first end of the inner sleeve 31 in the axial direction. An inlet for injecting the uncured resin 50a into the first end of the inner sleeve 31 in the axial direction can be widened. Widening the inlet for injecting the uncured resin 50a facilitates the uniform spreading of the uncured resin 50a in the circumferential direction in the gap formed between the inner sleeve 31 and the permanent magnet 70. As a result, pressure can be applied to the magnet pieces 60 more evenly in the circumferential direction. The magnet pieces 60 can be more evenly pressed against the inner circumferential surface 55b of the mold 55 since pressure can be applied to the magnet pieces 60 more evenly in the circumferential direction. Thus, the rotational balance of the motor rotor 25 can be improved.

In the method for producing the motor rotor 25, the inner sleeve 31 and the substantially cylindrical permanent magnet 70 are first disposed in the mold 55. A pressure greater than the pressure that fractures the permanent magnet 70 is then applied to the uncured resin 50a. The crack group C is formed in the permanent magnet 70 by applying a pressure greater than the pressure that fractures the permanent magnet 70 to the uncured resin 50a. Subsequently, the magnet pieces 60 are formed and the magnet pieces 60 are pressed against the mold 55. The inner circumferential surface 55b of the mold 55 is accurately aligned with respect to the rotational axis H. Thus, the magnet structure 32 having the same accuracy as the accuracy of alignment of the mold 55 can be formed by pressing the magnet pieces 60 against the inner circumferential surface 55b of the mold 55. Consequently, the rotational balance of the motor rotor 25 can be improved.

In the magnet, etc. disposing operation S01, a gap is formed between the inner circumferential surface 55b of the mold 55 and the outer circumferential surface 70a of the permanent magnet 70 by disposing the permanent magnet 70 having an outer diameter smaller than the inner diameter of the mold 55. In the first resin portion forming operation S02, after the permanent magnet 70 is fractured by the pressure of the uncured resin 50a being injected, the pressure continues to be applied to the uncured resin 50a. The gap G is formed between the inner circumferential surface 55b of the mold 55 and the outer circumferential surface 70a of the permanent magnet 70. The gap G is a clearance in which the permanent magnet 70 can move. As a result, the permanent magnet 70 can be disposed so as to conform to the shape of the inner circumferential surface 55b of the mold 55 which is accurately aligned with respect to the rotational axis H. After the permanent magnet 70 is fractured by the uncured resin 50a being injected, the pressure can be continued to be applied to the uncured resin 50a. As a result, the permanent magnet 70 can be more reliably pressed against the inner circumferential surface 55b of the mold 55. Thus, the rotational balance of the motor rotor 25 can be improved.

When machining a substantially cylindrical permanent magnet as described above, the machining accuracy of the inner diameter and the outer diameter is required to be increased to a level needed for a rotating machine such as the turbocharger 1. The inner circumferential surface 55b of the mold 55 is accurately aligned with respect to the rotational axis H. The outer circumferential surface 70a of the permanent magnet 70 and the inner circumferential surface 70b of the permanent magnet 70 are required to be even more accurately aligned with respect to the rotational axis H. When such permanent magnet 70 is used, it is difficult to ensure that the axis of the magnet portion 36 coincides with the rotational axis H. Thus, this has been a cause of rotational imbalance of the motor rotor 25.

Figure 14:
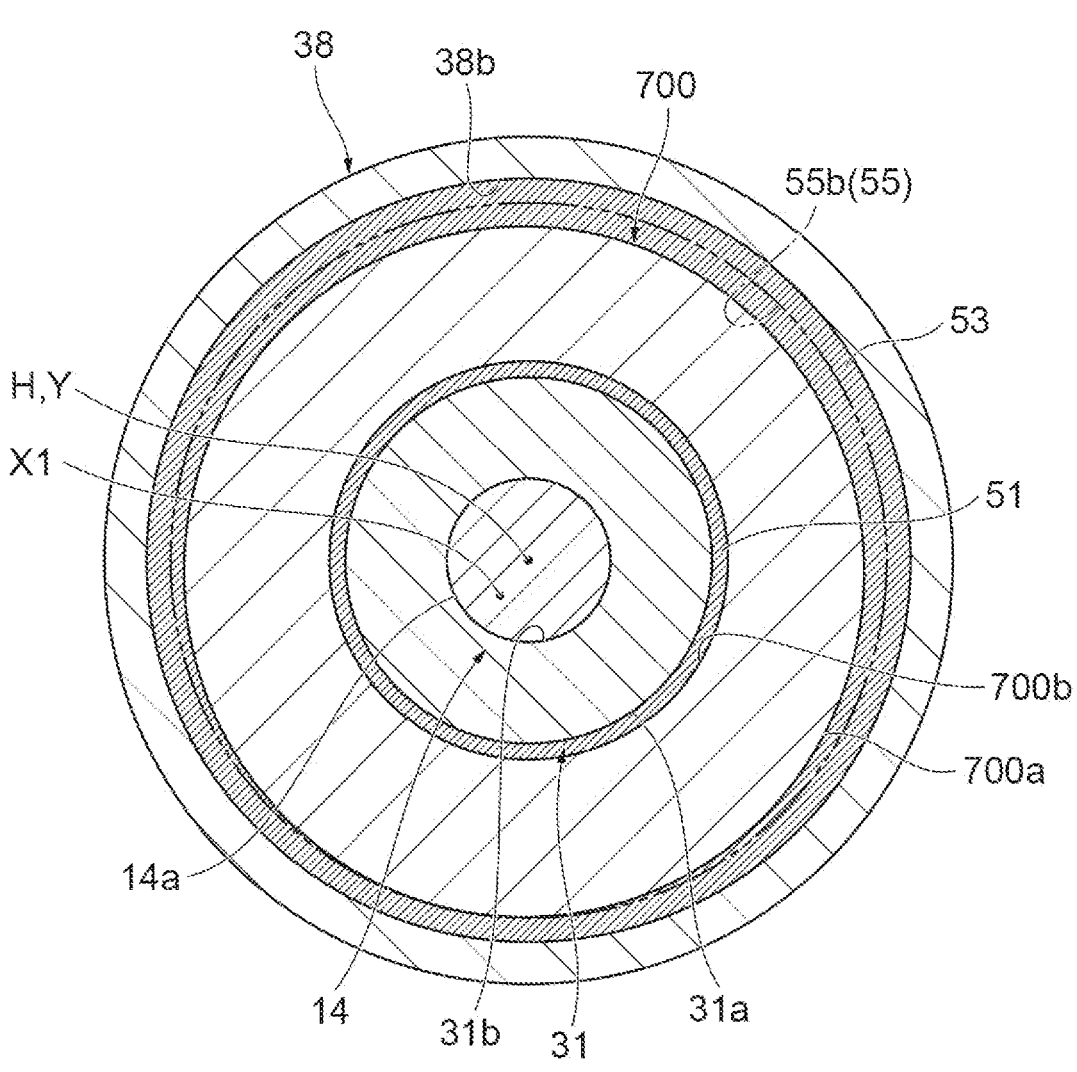
FIG. 14 is a cross-sectional view illustrating a motor rotor according to a comparative example.

FIG. 14 illustrates a motor rotor 250 which is a comparative example. FIG. 14 is an axial cross-sectional view of the motor rotor 250. In the example of FIG. 14, the inner diameters and the outer diameters of the inner sleeve 31, the protective layer 38, the first resin portion 51, and the third resin portion 53 of the motor rotor 250 are accurately aligned with respect to the rotational axis H. An inner circumferential surface 700b of a permanent magnet 700 is accurately aligned with respect to the rotational axis H. However, an outer circumferential surface 700a of the permanent magnet 700 is not accurately aligned with respect to the rotational axis H. The outer circumferential surface 700a of the permanent magnet 700 is offset from an ideal circle of a case in which the outer circumferential surface 700a of the permanent magnet 700 is accurately aligned with respect to the rotational axis H. Unlike the motor rotor 25, the crack group C is not formed in the permanent magnet 700 of the motor rotor 250.

As illustrated in FIG. 14, a center Y of the inner circumferential surface 55b of the mold 55 coincides with the rotational axis H. However, an axis X1 of the outer circumferential surface 700a of the permanent magnet 700 does not coincide with the rotational axis H. The axis X1 is thus offset away from the rotational axis H along the radial direction. In such motor rotor 250, it would be difficult to improve the rotational balance of the motor rotor 250 even if the inner diameters and the outer diameters of the inner sleeve 31, the protective layer 38, the first resin portion 51, and the third resin portion 53 were accurately machined with respect to the rotational axis H.

Figure 15:
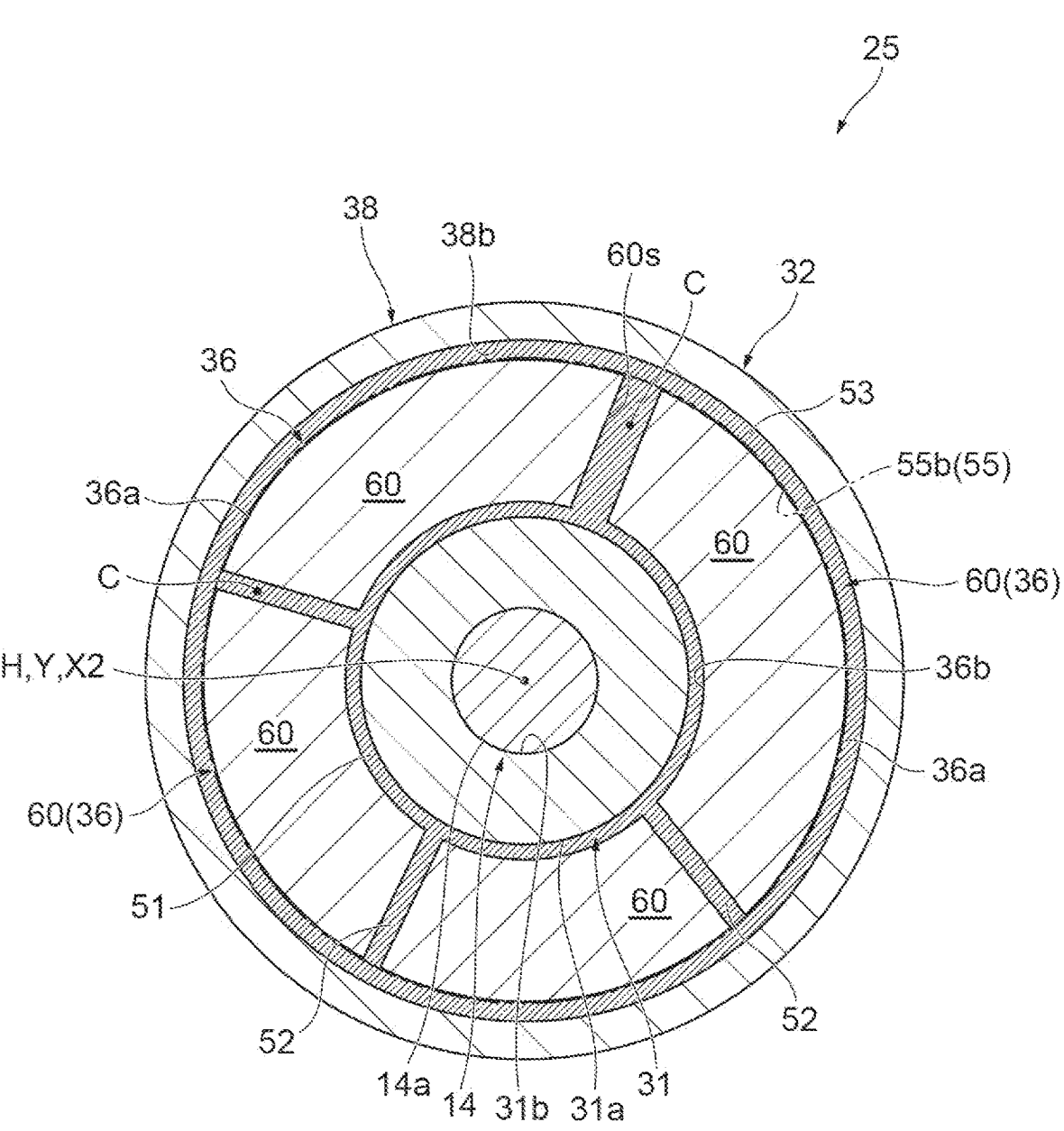
FIG. 15 is a schematic cross-sectional view of an example motor rotor.

FIG. 15 is a cross-sectional view illustrating the motor rotor 25. The motor rotor 25 includes the magnet pieces 60. However, these magnet pieces 60 were originally a cylindrical magnet having an outer circumferential surface that deviates from the design dimensions similarly to the permanent magnet 700.

In the example of FIG. 15, a pressure greater than the pressure that fractures the permanent magnet 70 is applied to the uncured resin 50a when injecting the uncured resin 50a between the inner sleeve 31 and the permanent magnet 70 as described above. The motor rotor 25 is formed by applying a pressure greater than the pressure that fractures the permanent magnet 70 to the uncured resin 50a. Forming the motor rotor 25 in this way results in brittle fracture of the permanent magnet 70. Thus, the crack group C is formed in the permanent magnet 70, and the magnet pieces 60 constituting the magnet portion 36 can be pressed against the inner circumferential surface 55b of the mold 55. The inner circumferential surface 55b of the mold 55 is accurately aligned with respect to the rotational axis H. An axis X2 of the magnet pieces 60 can thus coincide with the rotational axis H or at least be brought closer to the rotational axis H than the axis X1. That is, each of the divided magnet pieces 60 can move along the radial direction by the amount of the gap G. This movement enables the deviation from the ideal outer shape to be overcome. Consequently, the rotational balance can be improved in such motor rotor 25.

To produce a rotor, an uncured resin is injected between an inner sleeve and a magnet portion. Namely, an uncured resin is introduced by injection molding while limiting the pressure applied to the uncured resin to suppress the formation of cracks in the permanent magnet which is a brittle material. However, in examples of the method for producing (or method of manufacturing) the example motor rotor 25, a pressure (e.g, a fracturing pressure) that is greater than a threshold pressure to fracture the permanent magnet 70 is applied to the uncured resin 50a. The magnet pieces 60 can be pressed against the inner circumferential surface 55b of the mold 55 by applying a pressure greater than the pressure that fractures the permanent magnet 70 to the uncured resin 50a. Since the magnet pieces 60 can be pressed against the inner circumferential surface 55b of the mold 55, the axis X2 of the magnet portion 36 can be brought closer to the rotational axis H than in the example of the motor rotor 250 illustrated in FIG. 14 in which such magnet pieces 60 are not formed. Consequently, the rotational balance of the motor rotor 25 can be improved.

It is to be understood that not all aspects, advantages and features described herein may necessarily be achieved by, or included in, any one particular example. Indeed, having described and illustrated various examples herein, it should be apparent that other examples may be modified in arrangement and detail.

In some examples, the crack group C is composed of four cracks extending in the axial direction (first crack C1, second crack C2, third crack C3, and fourth crack C4) and two cracks extending in the circumferential direction (fifth crack C5 and sixth crack C6), but the crack group C may take various forms as long as it produces the effects of the invention.

In some examples, the diameter of the small diameter portion 35 is less as it gets closer to the first end of the inner sleeve 31. Additionally, the small diameter portion 35 has a tapered shape so as to decrease in diameter gradually. However, for example, the small diameter portion 35 may have a cylindrical shape such that a step is formed between the small diameter portion 35 and the large diameter portion 33 of the inner sleeve 31.

In some examples, the end ring 39a and the end ring 39b are disposed on the outer circumferential surface 34a of the base body portion 34 of the inner sleeve 31. However, the end ring 39a and the end ring 39b may be disposed so as to be spaced from the outer circumferential surface 34a of the base body portion 34. Additionally, in some examples, the outer diameter of the end ring 39a and the outer diameter of the end ring 39b are substantially the same as the outer diameter of the protective layer 38. However, the outer diameter of the end ring 39a, for example, need not be substantially the same as the outer diameter of the end ring 39b. In a case in which the fourth resin portion 54a formed on the one end surface 71a has the same function as the end ring 39a, the end ring 39a need not be provided. Furthermore, in a case in which the fourth resin portion 54b formed on the other end surface 71b has the same function as the end ring 39b, the end ring 39b need not be provided.

In some examples, the grooves 41 formed in the outer circumferential surface 33a of the large diameter portion 33 are composed of the circumferential groove 41a extending in the circumferential direction and the knurl grooves 41b extending helically along the axial direction. In some examples, the grooves 41 may be composed only of the circumferential groove 41a. In other examples, the grooves 41 may be composed only of the knurl grooves 41b. Additionally, the grooves 41 are not necessarily limited to the circumferential groove 41a and the knurl grooves 41b, depending on examples. In some examples, the knurl grooves 41b extend in two directions so as to intersect each other. The knurl grooves 41b form a criss-cross pattern by extending in two directions so as to intersect each other. However, for example, the knurl grooves 41b may extend in a single direction.

In some examples, in the first resin portion forming operation S02, a pressure less than the pressure that fractures the permanent magnet 70 is applied to the uncured resin 50a. Then, in the crack forming operation S03, a pressure greater than the pressure that fractures the permanent magnet 70 is applied to the uncured resin 50a. However, for example, a pressure greater than the pressure that fractures the permanent magnet 70 may be applied to the uncured resin 50a in the first resin portion forming operation S02.

According to brittle fracture, the permanent magnet 70 breaks irregularly. For example, the first crack C1 may be formed linearly in a macroscopic sense, or may extend irregularly. The relationship between the first crack C1 and the other cracks are also variable. As a result, in the magnet pieces 60 separated by the cracks (or fractures) C, the shape of at least one of the magnet pieces 60 is different from the shapes of the other magnet pieces 60. This expression may include various aspects.

According to examples, there is a case in which there are no magnet pieces 60 that can be considered as having the same shape, a case in which none of the magnet pieces 60 have the same shape. In such examples, it can be said, for example, that "the magnet pieces 60 have different shapes from each other."

There may be a case in which some of the magnet pieces 60 can be considered as having the same shape depending on the state of the cracks or the manner in which the shapes of the magnet pieces 60 are evaluated since the cracks are formed irregularly. That is, there are examples in which some of the magnet pieces 60 have different shapes, but some of the magnet pieces 60 can be considered as having the same shape. For example, the fractured magnet pieces 60 may include at least two adjacent magnet pieces 60 having different shapes and/or different volumes. In addition, the inner circumferential surfaces 60b of the adjacent pair of magnet pieces 60 may have different shapes and/or different areas. Similarly, the outer circumferential surfaces 60c of the adjacent pair of magnet pieces 60 may have different shapes and/or different areas.

That is, the magnet pieces 60 that constitute the magnet portion 36 may all have different shapes from each other, or some of the magnet pieces 60 may have the same shape.

The invention claimed is:

1. A motor rotor comprising:
a shaft that is rotatable around a rotation axis;
an inner sleeve disposed on an outer surface of the shaft; and
a magnet structure disposed around the inner sleeve,
wherein the magnet structure includes fractured magnet pieces and a first resin portion bonding a first magnet piece with a second magnet piece among the fractured magnet pieces,
wherein the first magnet piece has a first fracture surface that forms surface irregularities, and the second magnet piece has a second fracture surface that forms surface irregularities and that faces the first fracture surface to interpose the first resin portion between the first fracture surface and the second fracture surface,
wherein the first magnet piece and the second magnet piece include respective inner circumferential surfaces facing an outer circumferential surface of the inner sleeve,
wherein the inner circumferential surface of the first magnet piece has a surface area different from a surface area of the inner circumferential surface of the second magnet piece,
wherein the first fracture surface of the first magnet piece and the second fracture surface of the second magnet piece extend substantially in a radial direction of the shaft from the respective inner circumferential surfaces, the first resin portion extending substantially in the radial direction,
wherein the magnet structure further includes a second resin portion extending between the inner sleeve and the inner circumferential surfaces of the first magnet piece and the second magnet piece, and
wherein in a cross-section taken orthogonally to the rotation axis, the first magnet piece has a cross-sectional area that is different from a cross-sectional area of the second magnet piece.

2. The motor rotor according to claim 1,
wherein a surface roughness of the first fracture surface is greater than a surface roughness of the inner circumferential surfaces of the first magnet piece and the second magnet piece.

3. The motor rotor according to claim 1,
wherein the magnet structure further includes a protective layer disposed so as to surround the fractured magnet pieces,
wherein the first magnet piece and the second magnet piece include respective outer circumferential surfaces facing the protective layer, and wherein a surface roughness of the first fracture surface is greater than a surface roughness of the outer circumferential surfaces of the first magnet piece and the second magnet piece.

4. The motor rotor according to claim 1, further comprising a first end ring and a second end ring disposed at opposite ends of the magnet structure,
wherein the first magnet piece has a magnet end surface facing the first end ring, and
wherein a surface roughness of the first fracture surface of the first magnet piece is greater than a surface roughness of the magnet end surface.

5. The motor rotor according to claim 1,
wherein the magnet structure further includes a protective layer disposed so as to surround the fractured magnet pieces,
wherein the first magnet piece and the second magnet piece have respective outer circumferential surfaces facing the protective layer, and
wherein the outer circumferential surface of the first magnet piece has a surface area different from a surface area of the outer circumferential surface of the second magnet piece.

6. The motor rotor according to claim 1,
wherein the magnet structure further includes a protective layer disposed so as to surround the fractured magnet pieces,
wherein the first magnet piece and the second magnet piece have respective outer surfaces that are curved, and
wherein the outer surfaces and an outer end of the first resin portion extending between the first magnet piece and the second magnet piece form a circumferential surface facing the protective layer.

7. The motor rotor according to claim 1,
wherein the first magnet piece and the second magnet piece of the magnet structure are arranged in an axial direction of the shaft,
wherein the first magnet piece includes a third fracture surface that forms surface irregularities,
wherein the third fracture surface of the first magnet piece faces a third magnet piece from among the fractured magnet pieces of the magnet structure, and
wherein the first magnet piece and the third magnet piece are arranged in a circumferential direction extending around the rotation axis.

8. The motor rotor according to claim 1,
wherein the outer circumferential surface forms a groove that is recessed with respect to the outer circumferential surface and that extends substantially in a circumferential direction of the inner sleeve, and
wherein the second resin portion extending between the fractured magnet pieces and the outer circumferential surface of the inner sleeve fills the groove.

9. The motor rotor according to claim 1,
wherein the inner sleeve forms a large-diameter portion extending substantially in an axial direction of the shaft to face an inner circumferential surface of the magnet structure and a tapered portion extending from the large-diameter portion,
wherein the tapered portion decreases in diameter toward an end of the inner sleeve in the axial direction, and
wherein the second resin portion extending between the fractured magnet pieces and the inner sleeve contacts the large-diameter portion and the tapered portion of the inner sleeve.

10. A motor rotor comprising:
a shaft that is rotatable;
an inner sleeve disposed around the shaft, wherein the inner sleeve has an outer circumferential surface forming a groove that is recessed with respect to the outer circumferential surface and that extends substantially in a circumferential direction of the inner sleeve; and
a magnet structure disposed around the inner sleeve,
wherein the magnet structure includes magnet pieces including a first magnet piece and a second magnet piece, and further includes a first resin portion and a second resin portion, wherein the first magnet piece has a first fracture surface facing the second magnet piece and an outer surface forming a circumferential surface of the magnet structure, wherein a surface roughness of the first fracture surface is greater than a surface roughness of the outer surface of the first magnet piece, wherein the first resin portion bonds the first fracture surface of the first magnet piece with a second fracture surface of the second magnet piece, and wherein the second resin portion extends between the magnet pieces and the outer circumferential surface of the inner sleeve so as to fill the groove.

11. The motor rotor according to claim 10, wherein the first magnet piece and the second magnet piece are arranged along a circumferential direction, the first fracture surface having surface irregularities, wherein the first magnet piece and a third magnet piece from among the magnet pieces, are arranged along an axial direction of the shaft, and are further separated by a third resin portion, and wherein the first magnet piece includes an additional fracture surface having surface irregularities, the additional fracture surface facing the third magnet piece.

12. The motor rotor according to claim 10, wherein the first fracture surface of the first magnet piece is non-planar, and wherein the second fracture surface of the second magnet piece, facing the first fracture surface of the first magnet piece, has a shape that substantially matches a shape of the first fracture surface.

13. The motor rotor according to claim 10, wherein the shaft is rotatable around a rotation axis, and wherein in a cross-section taken orthogonally to the rotation axis, the first magnet piece has a cross-sectional area that is different from a cross-sectional area of the second magnet piece.

14. The motor rotor according to claim 10, wherein the outer surface of the first magnet piece is curved to form the circumferential surface of the magnet structure, and wherein the magnet structure further includes a protective layer that covers the circumferential surface, wherein the outer surface of the first magnet piece is bonded to the protective layer via an additional resin portion.

15. A motor rotor comprising:

a shaft that extends in an axial direction;

an inner sleeve disposed on an outer surface of the shaft, wherein the inner sleeve forms a large-diameter portion extending substantially in the axial direction of the shaft and a small-diameter portion extending from the large-diameter portion toward an end of the inner sleeve in the axial direction, wherein the small-diameter portion has a smaller diameter than the large-diameter portion; and a magnet structure disposed around the inner sleeve, wherein the magnet structure comprises:

fractured magnet pieces including a first magnet piece having a first fracture surface that forms surface irregularities, and a second magnet piece having a second fracture surface that forms surface irregularities and that faces the first fracture surface;

a first resin portion interposed between the first fracture surface and the second fracture surface to bond the first magnet piece with the second magnet piece; and a second resin portion extending between the fractured magnet pieces and the inner sleeve, wherein the second resin portion contacts both the large-diameter portion and the small-diameter portion of the inner sleeve.

16. The motor rotor according to claim 15, wherein the small-diameter portion is a tapered portion that decreases in diameter toward the end of the inner sleeve in the axial direction.

17. The motor rotor according to claim 15, wherein the shaft is rotatable around a rotation axis, and wherein in a cross-section taken orthogonally to the rotation axis, the first magnet piece has a cross-sectional area that is different from a cross-sectional area of the second magnet piece.

18. The motor rotor according to claim 15, wherein the inner sleeve has an outer circumferential surface forming a groove that is recessed with respect to the outer circumferential surface and that extends substantially in a circumferential direction of the inner sleeve, and wherein the second resin portion extends between the fractured magnet pieces and the outer circumferential surface of the inner sleeve so as to fill the groove.

* * * * *